(12) United States Patent
Kavana

(10) Patent No.: US 9,632,328 B2
(45) Date of Patent: *Apr. 25, 2017

(54) ACCESSORY FOR GLASSES

(71) Applicant: Ted Kavana, Waxhaw, NC (US)

(72) Inventor: Ted Kavana, Waxhaw, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/939,646

(22) Filed: Nov. 12, 2015

(65) Prior Publication Data

US 2016/0109723 A1 Apr. 21, 2016

Related U.S. Application Data

(63) Continuation of application No. 13/895,479, filed on May 16, 2013, now Pat. No. 9,195,076.

(60) Provisional application No. 61/647,733, filed on May 16, 2012.

(51) Int. Cl.
  *G02C 5/00* (2006.01)
  *G02C 11/00* (2006.01)
  *G02C 11/02* (2006.01)
  *G02C 11/04* (2006.01)

(52) U.S. Cl.
  CPC ............. *G02C 5/008* (2013.01); *G02C 11/00* (2013.01); *G02C 11/02* (2013.01); *G02C 11/04* (2013.01); *G02C 2200/16* (2013.01)

(58) Field of Classification Search
  CPC ........ G02C 5/008; G02C 11/00; G02C 11/02; G02C 2200/16; G02C 5/14; G02C 5/146
  USPC .............................. 351/43, 52; 441/133–134
  See application file for complete search history.

(56) References Cited

U.S. PATENT DOCUMENTS

| | | | | |
|---|---|---|---|---|
| 3,016,796 A | * | 1/1962 | Boothe | G02C 5/00 351/111 |
| 3,038,375 A | * | 6/1962 | Gansz | G02C 5/00 351/111 |
| 3,390,938 A | * | 7/1968 | Gansz | G02C 11/00 351/111 |
| 3,711,190 A | * | 1/1973 | Blair | G02C 11/00 351/43 |

* cited by examiner

*Primary Examiner* — Ricky Mack
*Assistant Examiner* — Kristina Deherrera
(74) *Attorney, Agent, or Firm* — Attentive Law; Paul Ratcliffe

(57) ABSTRACT

The present invention provides an accessory for eyeglasses or sun glasses which fit over the arms of the sunglasses and allows the user to add flotation pieces, lights or lighting elements, or embellishments. The accessory can be quickly installed and allows the user to customize the color and design of their accessory.

16 Claims, 17 Drawing Sheets

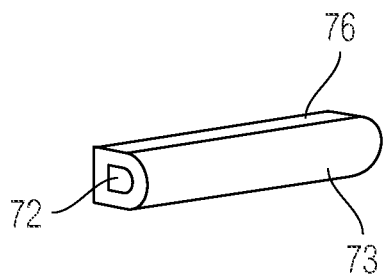
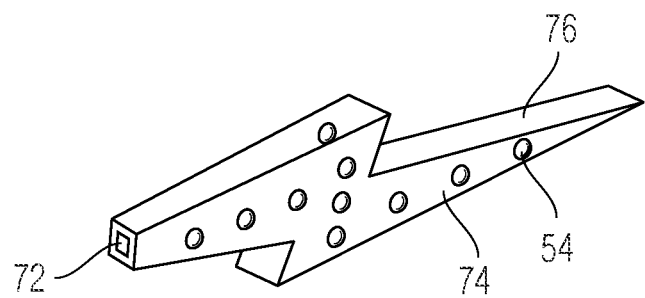
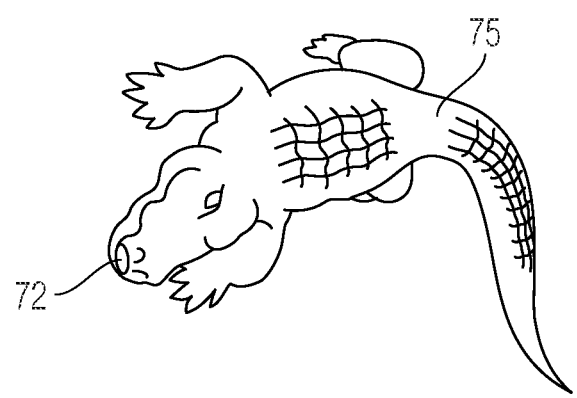
Fig. 7

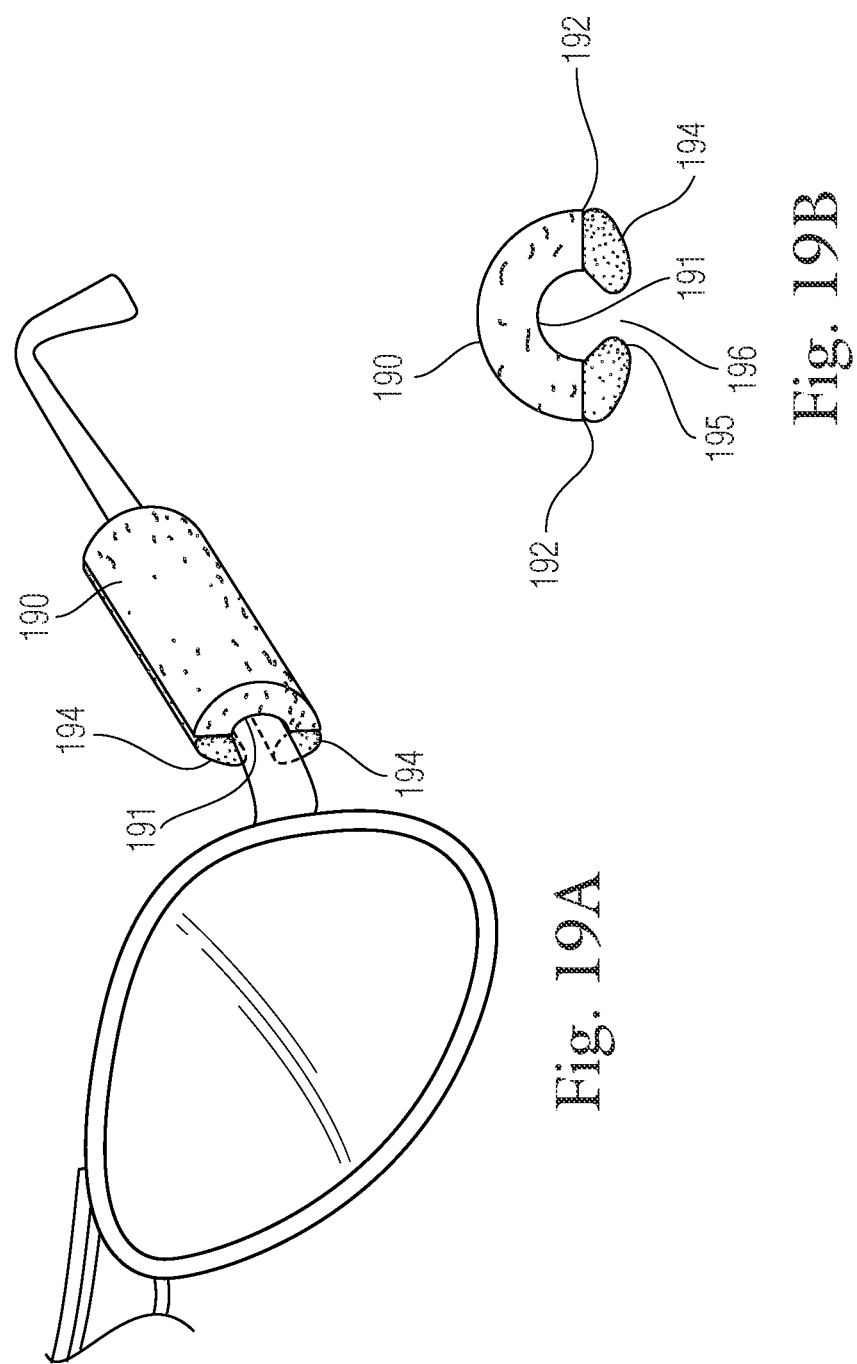

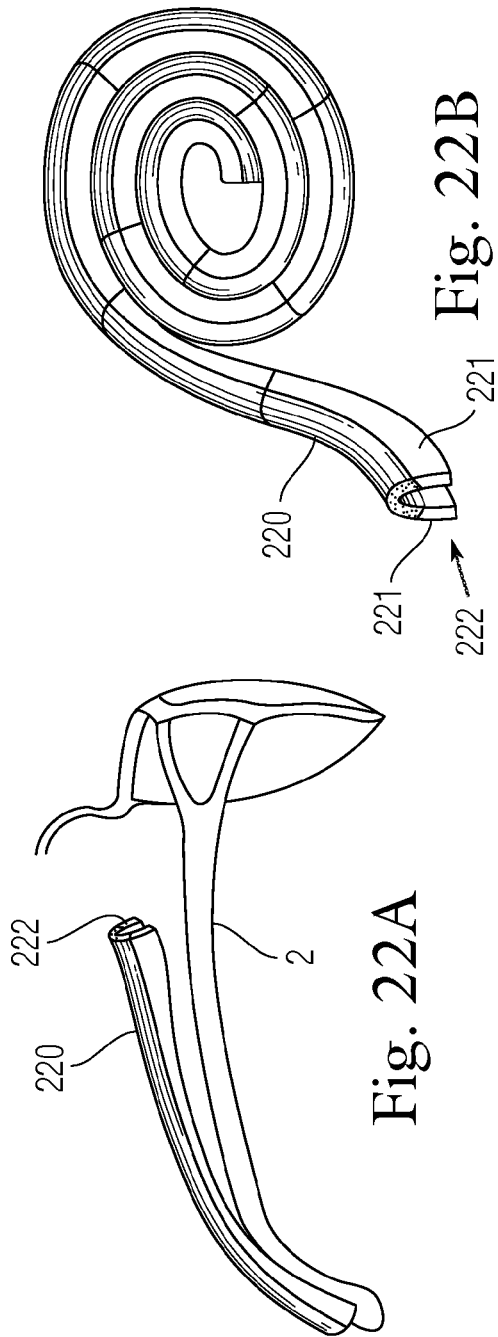
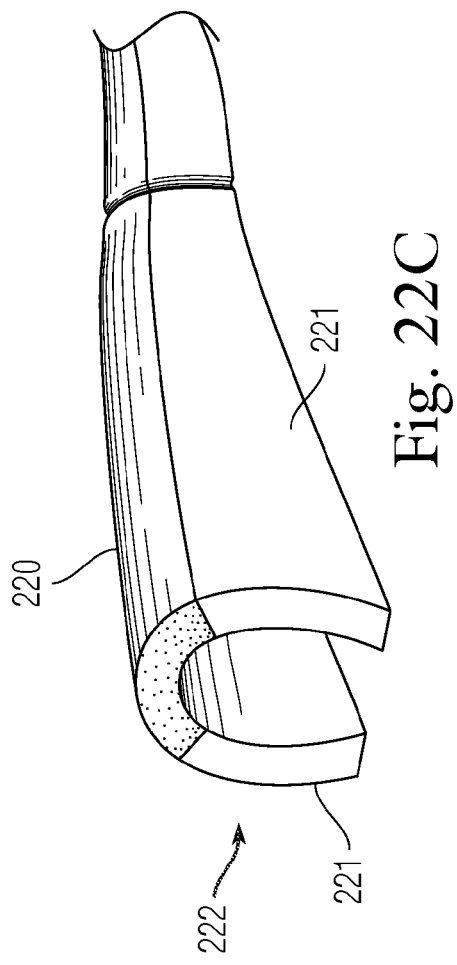
Fig. 22A
Fig. 22B
Fig. 22C

ACCESSORY FOR GLASSES

RELATED APPLICATION

This application is a Continuation of U.S. patent application Ser. No. 13/895,479, filed on May 16, 2013 entitled "Accessory for Glasses, which is incorporated herein by reference in its entirety. This application and U.S. patent application Ser. No. 13/895,479 claims the benefit of U.S. Provisional Application Ser. No. 61/647,733, entitled "Accessory for Glasses", filed on May 16, 2012, the entirety of which is incorporated herein.

BACKGROUND OF THE INVENTION

1. Field of the Invention

The present invention relates generally to accessories for eyeglasses which provide flotation assistance, lighting, or an ability to add cosmetic designs and attachments.

2. Description of the Related Art

The prior art does not provide for the instantaneous customization of eyewear, such as eyeglasses and sunglasses, when circumstances require it. There are situations in which a pair of sunglasses need the ability to float, or the ability to provide extra light in a dimly lit area. There is also a need for glasses to be instantaneously customizable to reflect the ever-changing fashion trends. Many attachments known in the prior art are not multifunctional and do not provide for instant customization. There are devices in the prior art that provide buoyancy for glasses, but they cannot, with ease, be combined with or converted into a devise that radiates light or a device that allows for ornamental customization.

Therefore, what is needed is an interchangeable accessory for glasses that allows for instant customization and conversion with ease.

SUMMARY OF THE INVENTION

This summary is provided to introduce concepts in a simplified form that are further described in the detailed description of the invention. This summary is not intended to identify key or essential inventive concepts of the claimed subject matter, nor is it intended for determining the scope of the claimed subject matter.

The present invention provides an accessory for eyeglasses or sunglasses in which the accessory provides a flotation element to enable the glasses to float in water. Alternatively, the accessory can be designed to provide one or more lights or illuminating devices to provide both a functional and entertainment value. The accessory device can also be designed to allow the user to decorate and design attractive elements to customize the look of ones glasses through the accessory.

More specifically, the present invention provides for an eyeglass accessory comprising: a flotation element having an outside surface and an inside surface; a sleeve made of a flexible material attached to the inside surface of the flotation element, wherein a channel is created between the sleeve and the flotation element for receiving the arm of pair of eyeglasses; wherein the sleeve further comprises at least two slits formed at an angle to the channel wherein the slits form at least two flaps for receiving the arm of a pair of eyeglasses. The sleeve may be attached to the inside surface of the flotation element by adhesive. The channel is formed by applying adhesive to a left edge and a right edge of the sleeve and flotation element with no adhesive applied to the center of the sleeve or the center of the inside surface of the flotation element. The slits are formed at approximately ninety degrees to the channel or may be formed at an acute or obtuse angle to the channel.

The present invention also comprises an eyeglass accessory comprising: a flotation element having an outside surface, a top longitudinal edge, a bottom longitudinal edge, and an inside surface; and a sleeve made of a flexible material having an upper flap and a lower flap; wherein the sleeve is adjacent to the inside surface of the flotation element and at least a portion of the upper flap crosses over the top longitudinal edge of the flotation device and attaches to a portion of the outside surface of the flotation element; and wherein at least a portion of the lower flap crosses over the bottom longitudinal edge of the flotation device and attaches to a portion of the outside surface of the flotation element, and wherein a channel is created between the sleeve and the inside surface of the flotation element for receiving the arm of pair of eyeglasses. The upper flap may cross over the full length of the top longitudinal edge and the lower flap may cross over the full length of the bottom longitudinal edge. The accessory may also include one or more mechanical attachment elements which may be applied to fasten the upper and/or lower flap to the flotation element. The mechanical attachment element may be one of a screw, a pin, a rivet, or a snap. The sleeve is made from material comprised of at least one of a scuba material, nylon, leather, spandex, or rubber.

The present invention also comprises an eyeglass accessory comprising:

a flexible element having: a main back area with a first arm, a second arm, a third arm, and a fourth arm extending from the main back area. A first cross member connects the first arm and the second arm and a second cross member connects the third arm and the fourth arm. The accessory also includes a flotation element having an inner surface which mates adjacent to the main back area of the flexible element and an outer surface which mates with the first cross member and the second cross member. A channel is formed between the inner surface of the flotation element and the main back area of the flexible element where the formed channel receives the arm of a pair of eyeglasses. The flotation element may also have a first groove for receiving the first cross member and a second groove for receiving the second cross member. The main back area and the first arm, second arm, third arm, and fourth arm are all on the relative same horizontal plane. The first cross member and second cross member generally extend out of the horizontal plane such as at a perpendicular axis out of the horizontal plane. Further, the first cross member and second cross member may be in a general semi-circular in shape. The flotation element may be formed into an artistic shape such as a car, a football, an animal, a mascot, or a logo.

These and other objects, features, and/or advantages may accrue from various aspects of embodiments of the present invention, as described in more detail below.

BRIEF DESCRIPTION OF THE DRAWINGS

The foregoing summary, as well as the following detailed description of the invention, is better understood when read in conjunction with the appended drawing. For the purpose of illustrating the invention, exemplary constructions of the invention are shown in the drawings. However, the invention is not limited to the specific methods and instrumentalities disclosed herein.

FIG. 7 illustrates a perspective view of several flotation designs of the present invention;

FIG. 19A illustrates a perspective view of a flotation accessory with left and right flexible longitudinal members adhered to a flotation element;

FIG. 19B illustrates a side view of the accessory in FIG. 19A;

FIG. 22A illustrates a right side profile view of a ¾ flotation sleeve embodiment of the accessory of the present invention;

FIG. 22B illustrates a perspective view of the accessory in FIG. 22A; and

FIG. 22C illustrates a perspective segment view of the present invention in FIG. 22A.

DETAILED DESCRIPTION OF EXEMPLARY EMBODIMENTS

Particular embodiments of the present invention will now be described in greater detail with reference to the figures.

Figure 1A:
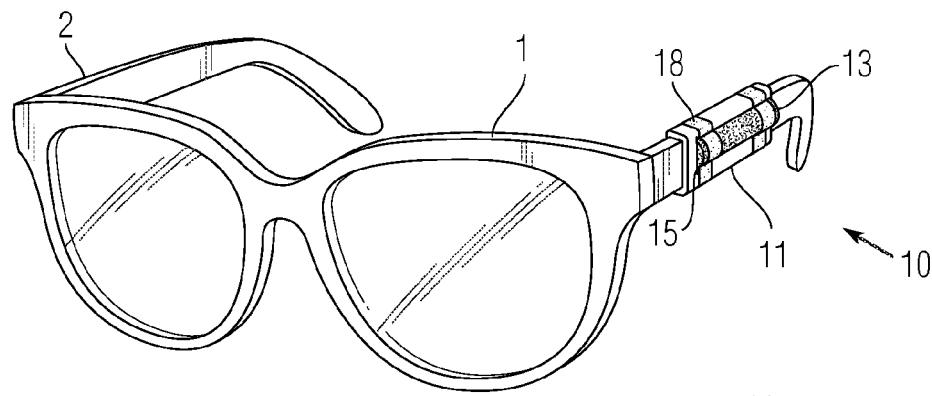
FIG. 1A illustrates a first embodiment of the present invention attached to a pair of glasses.
Figure 1B:
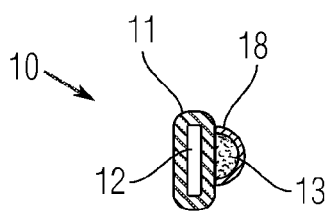
FIG. 1B illustrates a perspective view of a first embodiment of the present invention.
Figure 1C:
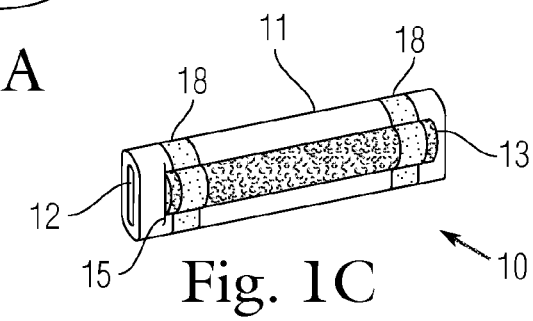
FIG. 1C illustrates a profile view of a first embodiment of the present invention.

In accordance with FIGS. 1A, 1B, and 1C, a first embodiment of the present invention provides an accessory 10 for placing over the arms 2 of eye glasses 1. The accessory 10 is ideally made from a stretchable or pliable material 11 which can expand to fit over the arm 2. The accessory 10 is formed into a tube or sleeve like design with an opening 12 for fitting over the arm 2. The sleeve or accessory 10 can fit over the entire arm 2 or a portion of the arm 2. Further, the color of the sleeve 10 can vary. In the first embodiment, the accessory 10 is designed to fit one or more flotation pieces 13. The flotation pieces 13 could be foam, cork, or any material with buoyancy capable of allowing the glasses 1 to float. The user would attach one sleeve 10 to each arm 2 such that there are flotation pieces 13 on each arm 2.

The floatation pieces 13 can be inserted or attached to the sleeve 10 in several ways. The sleeve 10 might contain one or more slits 15 in the material 11, which allow the flotation pieces 13 to be inserted or slid into a pocket within the accessory 10. The accessory 10 could also contain one or more straps 18 which can be used the hold or attach the flotation pieces 13. There can be any number of straps 18 and they can be of various sizes. The straps 18 can be elastic and designed to stretch to put the flotation pieces 13 in place or they can have a Velcro end which can detach to put the flotation piece 13 in place and then attached again. The flotation pieces 13 once attached to the sleeve 10 might be completely covered within a pocket, partially exposed, or fully exposed. The floatation pieces 13 that are fully exposed could extend past the length and exceed the width of the sleeve.

Both the sleeve 10 and the flotation pieces 13 can be designed to draw attention to the eye glasses 1. The sleeve 10 or flotation pieces 13 might be brightly colored or might include one or more color patterns, designs, and/or logos. By way of example, the sleeve 10 might be green in color with the flotation piece 13 orange in color with a University of Miami logo in the middle of the flotation piece 13. Through various color selections and logos, the user can customize their eye glasses flotation accessory 10. Although the sleeves 10 are provided in pairs, one for each arm 2, the flotation pieces 13 are designed to be buoyant enough so that only one flotation piece 13 is needed to keep the glasses 1 afloat in water.

Figure 2A:
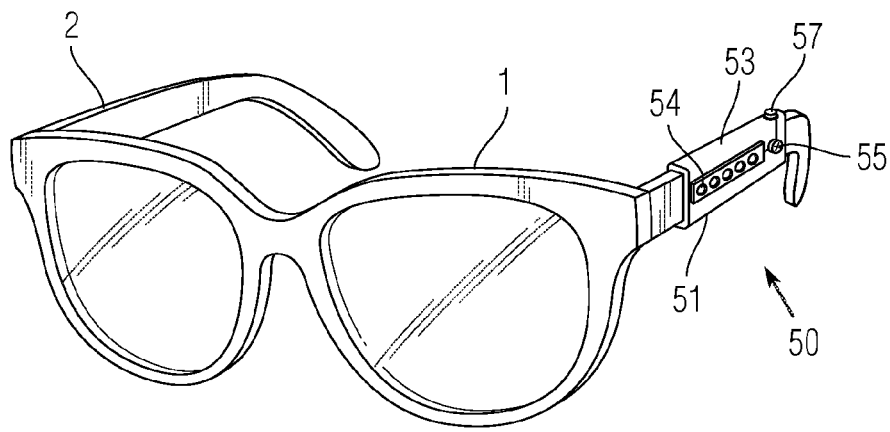
FIG. 2A illustrates a second embodiment of the present invention attached to a pair of glasses.
Figure 2B:
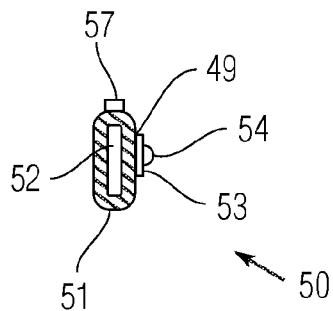
FIG. 2B illustrates a perspective view of a second embodiment of the present invention.
Figure 2C:
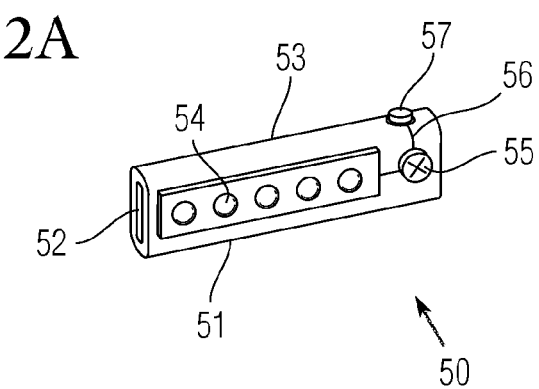
FIG. 2C illustrates a profile view of a second embodiment of the present invention.

In accordance with FIGS. 2A, 2B, and 2C, a second embodiment of the present invention provides an accessory 10 for placing over the arms 2 of eye glasses 1. The accessory 50 is ideally made from a stretchable or pliable material 51 which can expand to fit over the arm 2. The accessory 50 is formed into a tube or sleeve like design with an opening 52 for fitting over the arm 2. In the second embodiment, the accessory 50 is designed to include a light strip 53. The light strip 53 includes one or more lights 54. The lights 54 are ideally light emitting diodes (LED). The lights or LEDs 54 are connected (via wire 56) to a battery or power source 55. The lights 54 can be turned on and off or controlled by a controller and switch 57.

Figure 3:
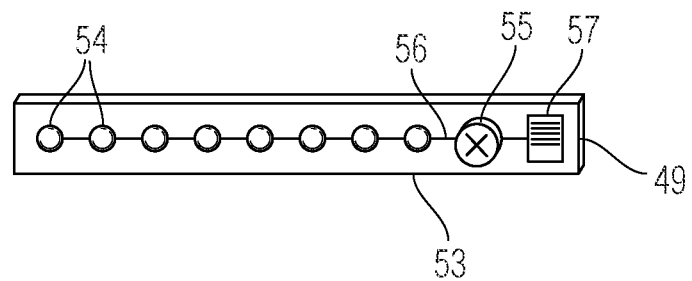
FIG. 3 illustrates a side view of the LED board of the present invention.
Figure 4:
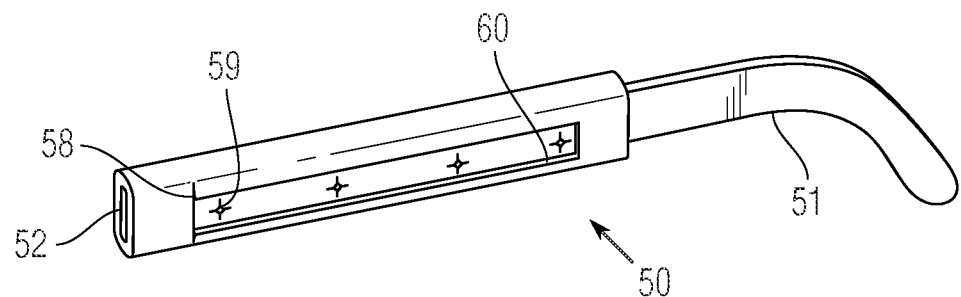
FIG. 4 illustrates a perspective view of the sleeve of the present invention.

In one embodiment, as best seen in FIGS. 2C, 3 and 4, the light strip 53 is made of plastic with a back panel 49 which is inserted and/or sewn into a pocket 60 through slit 58 of the sleeve 50. The back panel 49 of the LED light strip allows the LEDs to be configured as a strip and enables the LEDs to be connected to one another. The back panel 49 also benefits the placement of the sleeve 50 on the arm 2 of the glasses 1. Since the back panel 49 is semi-rigid the panel 49 is more inclined to rest on the outer flat surface of the arm 2. Therefore, the light strip 53 is more likely to remain in an outwardly facing direction for optimally visibility of the LEDs by others. The number of LEDs or lighting elements can be increased and can also be configured to such that the LEDs or lighting elements can be aligned to display words or configured to act as a billboard or a scrolling billboard.

Figure 5A:
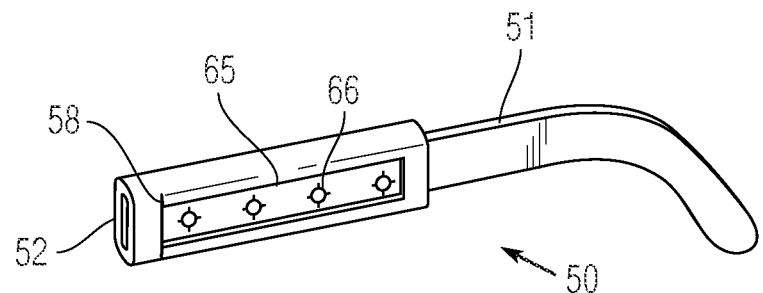
FIG. 5A illustrates a perspective view of an receiving panel integrated into the sleeve of the present invention.
Figure 5B:
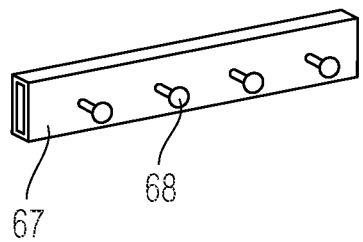
FIG. 5B illustrates a perspective view of the back surface of an accessory panel that mates with the receiving panel of the present invention

The panel 49 can be inserted or attached to the sleeve 50 in several ways. The sleeve 50 may be manufactured with a pocket within the accessory 50. As seen in FIG. 4, the sleeve 50 has one or more slits or openings 59 for exposing the LEDs. Alternatively, the light strip 53 may be attached with straps and previously described. Further, as shown in FIG. 5A, the sleeve or accessory 50 may have an attachment or receiving panel 65 sewn or inserted into the sleeve 50 which mates with or receives a detachable light strip 53. The receiving panel has one or more snap fit openings 66 designed into the receiving panel 65. The back of the light strip 67, as seen in FIG. 5B, would have corresponding protrusions 68 which snap into the openings 66 of the receiving panel 65. The light strip 53 could be snap fit into the attachment panel for easy attachment or removal. The male/female design depicted in FIGS. 5A and 5B are only one of a myriad of snap fit designs which could be employed for connecting the light strips 53 to the receiving panel 65.

Further, because the light strip 53 is detachable, the user can select from a variety of LED light strips 53 they would like to attach. Thus, the user can select an LED strip 53 of one color for one occasion and another strip 53 for a different occasion. In addition, the light strip 53 could use different lighting devices such as employing electroluminescent wire ("ELW") instead of LEDs.

The LEDs/ELWs are activated by the controller and switch 57. In addition to turning the LEDs/ELWs on and off, the controller 57 can be used to vary the lighting patterns of the LED/ELW strip. Therefore, the user can enter into one or more flash modes, varying color flash modes, or an all on mode. The user can depress the switch 57 to cycle through and change modes or to turn the light strip 53 on or off.

The LED/ELWs may also be activated and controlled by one or more sensors. A vibration sensor may be used to control the lighting pattern based upon movement of the head (vibration sensor). For example, if the glasses were set down for an extended period of time, the vibration sensor would stop moving and would trigger the LED/ELW strip to power down to conserve the battery 55. The vibration sensor could also be used to remind users that they placed their glasses down, by way of a security mode. A security mode would encompass lighting up one or more LEDs on the light strip 53 in a set pattern, such as every 10 seconds. The vibration sensor ideally would be a level embedded on the sleeve.

Additional sensors such as heat sensors and proximity sensors can be used to identify when the glasses are removed from the user's head. The heat sensor would notice a drop in heat and the proximity sensor would notice it is no longer near the head or temple region of the user. In both instances, the light strip 53 can be controlled to perform one or more functions. Such functions include turning the light strip 53 off, and turning the light strip into a certain mode such as a security mode.

The present invention also may be a combination of both the light strip 53 and the flotation pieces 13. Such combination would be particularly useful on a boat or at the beach when there is diminished light. By having the light strip 53 active the glasses would be easier to see or find if they fell in the water. The flotation pieces 13 would keep the glasses afloat while the light strip 53 was easily detectable. The light strip 53 can also be configured to turn on when it hits the water. Such could be accomplished by the vibration sensor identifying a falling and then stopping motion to turn on the light strip 53 or could employ an open circuit which closes in the presence of water. Water itself is not conductive but the impurities and minerals within the water make it conductive and enable current to flow in the circuit and trigger the light strip 53 to turn on.

Figures 6A, 6B:
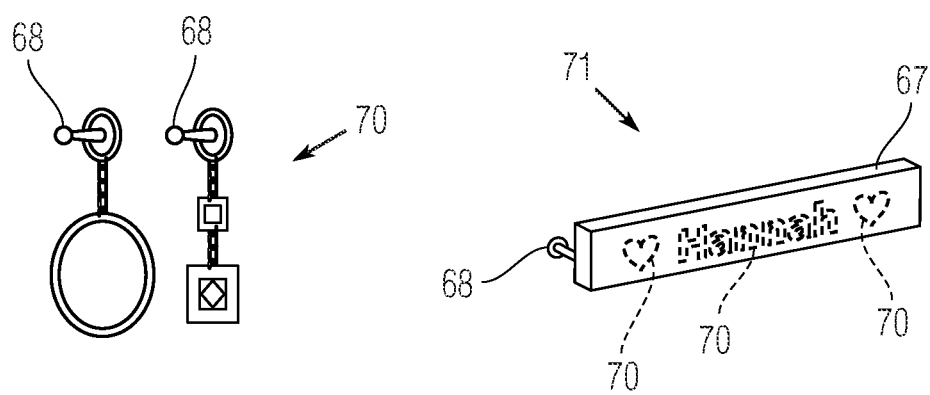
FIG. 6A illustrates embellishments which can be attached to the receiving panel of the present invention.
FIG. 6B illustrates a perspective view of an embellishment panel of the present invention with mates with the receiving panel of the present invention.

The same attachment panel 65 sewn or embedded within the sleeve 50 and used for the light strips 53 could be used for alternative purposes. First, as discussed in combination with FIG. 1A-1C, the flotation pieces 13 could be made with snap fit components (i.e. 68) to attach to the sleeve 50 by attaching to the attachment panel 65 through the snap fit openings 66. In addition, as seen in FIGS. 6A and 6B, various embellishments such as jewelry 70 could be designed to snap into the attachment panel 65 or for an entire embellishment strip 67 to snap into the attachment panel 65. The jewelry 70 or embellishment strip 67 would be designed with one or more snap fit components 68 to mate with the attachment panel 65 openings 66. Thus, the user can customize the sleeve 50 or the embellishment strip 67 using various embellishments 70 to create their own look and design.

Figure 11:
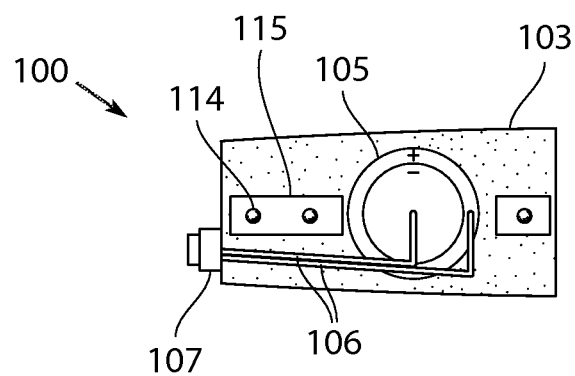
FIG. 11 illustrates a cross sectional side view of the flotation accessory of FIG. 10.

Additional alternative embodiments are provided in FIG. 11. FIGS. 7A, 7B, and 7C show one or more flotation piece designs 73, 74, 75 which employ a flat side 76 aligned to mate with the head of the user. The arm 2 of the glasses 1 would be inserted into the receiving slot 72. The flotation pieces 73, 74, 75 might include one or more LEDs 54 (or lighting devices) integrated into the design. The flotation pieces could be made of cork, foam, rubber or other buoyant material.

Figure 8:
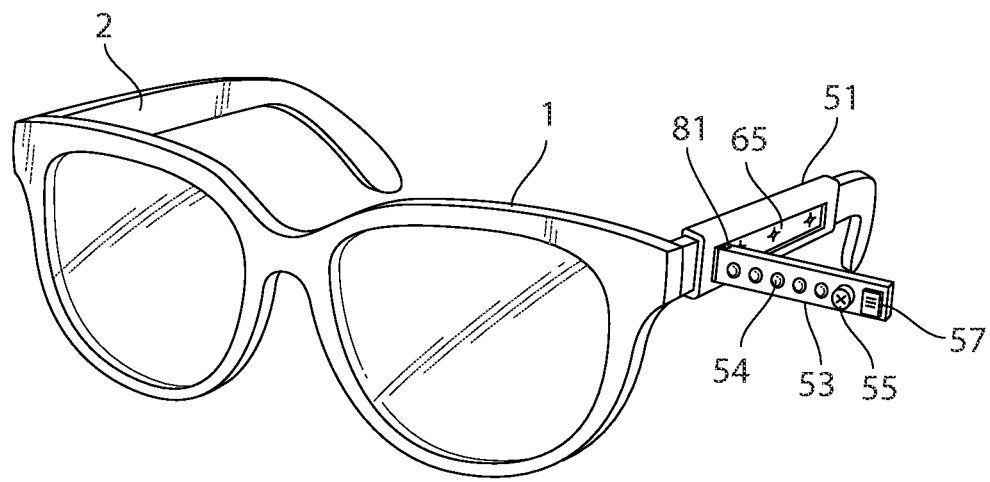
FIG. 8 illustrates a perspective view an accessory with an LED strip rotated for forward illumination in accordance with one embodiment of the present invention.

FIG. 8, shows a modified design of the embodiment disclosed in FIG. 3 wherein the sleeve 51 includes a light strip 53 hinged (via hinge 81) to the receiving panel 65. The user would disengage the non-hinged end from the receiving panel 65 and rotate the light strip 53 to a forward facing position. The light strip 53 can contain one or more LEDs 54 or other lighting devices and once rotated forward would illuminate the area the wearer is viewing. Such configuration would allow the user to illuminate a book they are reading or something they are working on.

Still further, the light strip 53 can be arranged to attach to or snap into a clip, a bookmark, a bracelet, a bike seat, or a necklace providing the ability to illuminate almost anything. Such could be useful as a safety device to illuminate the wearer at night or to clip to an item so that you do not forget to take it with you. By way of example, a user could attach a light strip 53 to a clip which they attach to a portable tablet (i.e. an iPad or Kindle). The user presses the control switch 57 to place the light strip in security mode so that the LEDs 54 on the strip 53 light every 10 seconds. Thus, if the user sets the tablet down they are reminded by the light to not forget their device.

Figure 9:
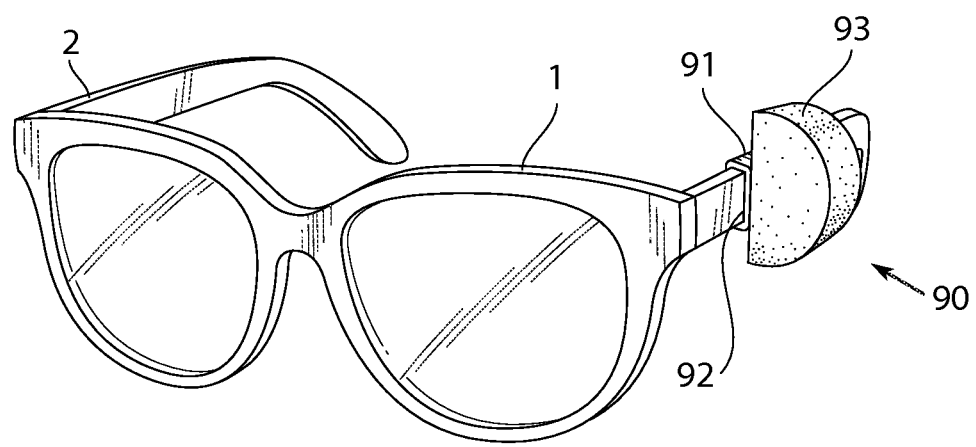
FIG. 9 illustrates a perspective view of a flotation accessory with an attached sleeve.

FIG. 9 shows a modified design of the embodiment disclosed in FIG. 1A wherein the flotation pieces 93 extends beyond the height of the sleeve 90 and is attached to the sleeve 90 with glue. The sleeve 90 is ideally made from stretchable or pliable material 91 formed into a tube or sleeve like design with an opening 92 for fitting over the arm 2. The flotation pieces 93 could be foam, cork, or any material capable of allowing the glasses to float.

Figure 10:
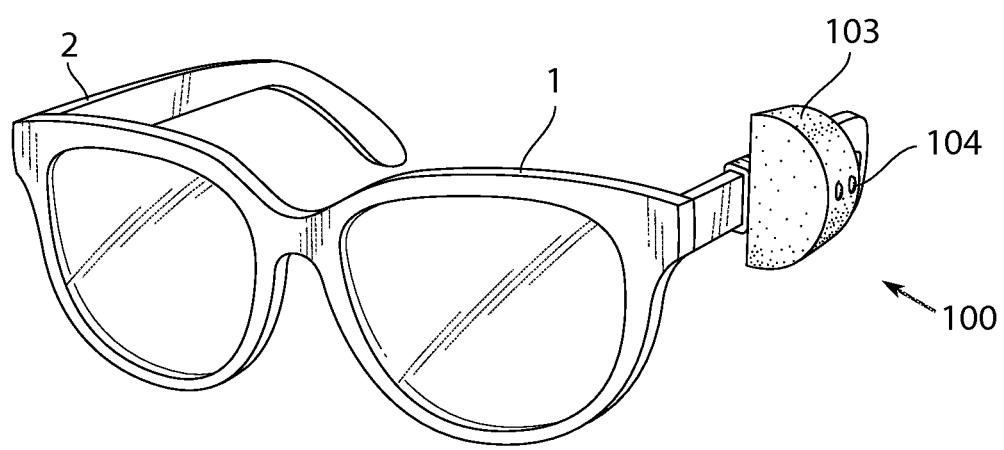
FIG. 10 illustrates a perspective view of a flotation accessory with an attached sleeve with embedded lighting elements.

FIGS. 10 and 11 show a modified design of the embodiment disclosed in FIG. 9 wherein the flotation pieces 103 include lights embedded in the cork. There would be one or more lights 104 that slightly protrude out of the cork 103. The lights are ideally light emitting diodes (LED). The lights or LEDs are connected (via wire 106) to a battery or power source 105. The switch 107 allows power from the battery 105 to flow to the strip 114 and light the LEDs 104. The switch 107 can turn the lights on and off or can be used to vary the lighting patterns. The battery and switch may be embedded within the cork or attached to the sleeve.

Figure 12:
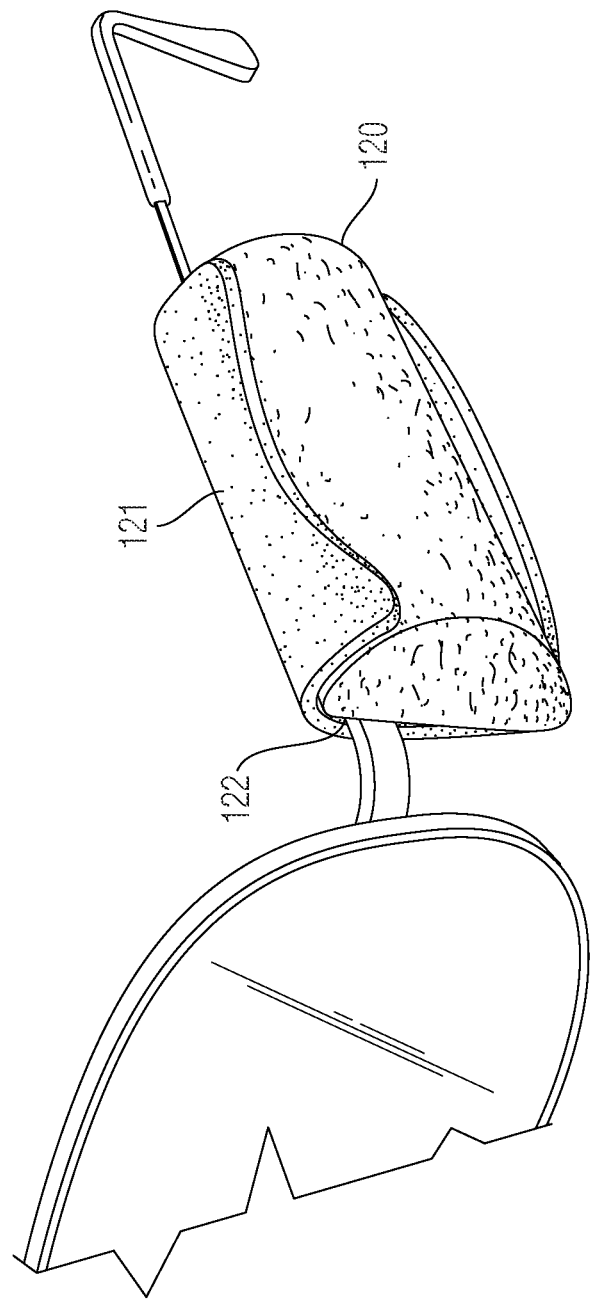
FIG. 12 illustrates a perspective view of a flotation accessory with an attached sleeve with an upper and lower flap.

FIG. 12 shows a modified design of the embodiments disclosed in FIG. 1A and FIG. 9 wherein an upper flap and a lower flap of the sleeve 121 wraps around the top and bottom longitudinal portions of the flotation piece 120 in a manner that securely attaches the sleeve to the flotation piece 120. The flaps could cover the full longitudinal length of the flotation piece 120 or only portions of the upper and lower flap could cross over to the front surface of the flotation element 120. In an exemplary embodiment, the upper and lower flaps would comprise 5-10% of the full sleeve 121 size. The sleeve 121 is not attached, or not fully attached, to the back of the flotation piece 120 thus creating an opening 122 in which the arm 2 of a pair of glasses can slide through. The sleeve 121 is ideally made from stretchable or pliable material, such as neoprene or leather.

Figure 13:
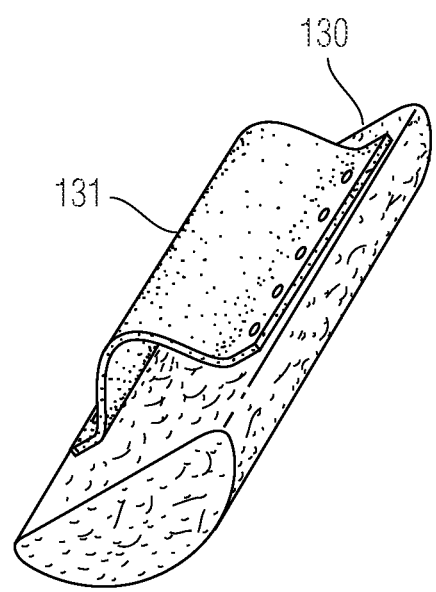
FIG. 13 illustrates a perspective view of the back of a flotation accessory with an attached backing sleeve with a formed channel.

FIG. 13 shows a modified design of the embodiment disclosed in FIG. 9 wherein the length of the sleeve 131 is horizontally attached to the back of the flotation piece 130 creating an opening 132 in which the arm 2 of a pair of sunglasses can slide through. The sleeve may be attached to the back of the flotation device 130 by adhesive, stitching, or mechanical fastening. The sleeve 131 is ideally made from stretchable or pliable material, such as neoprene or leather.

Figure 14B:
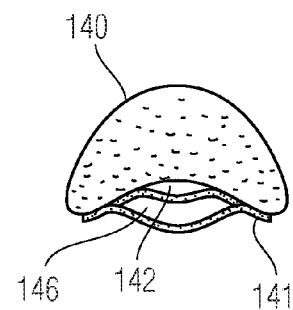
FIG. 14B illustrates an end view of the accessory in FIG. 14A.
Figure 14A:
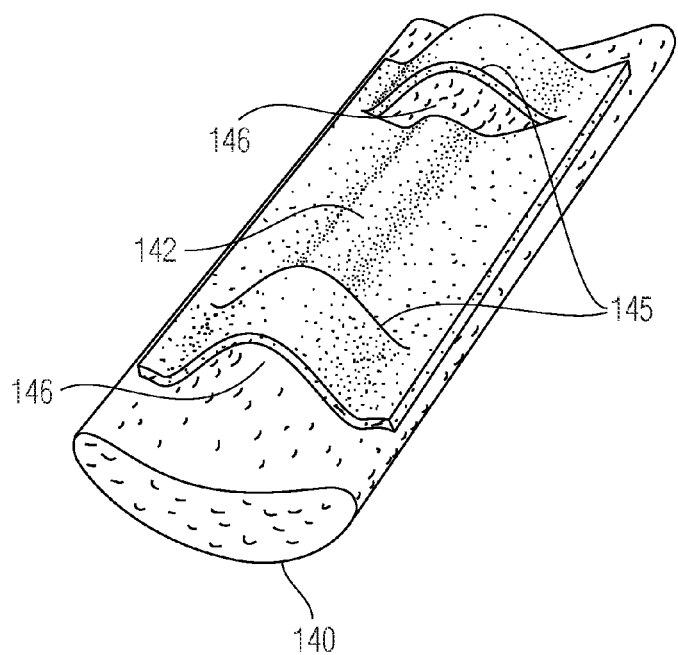
FIG. 14A illustrates a perspective view of the back of a flotation accessory with an attached backing sleeve with a formed small arm channel and formed big arm channel.
Figure 14C:
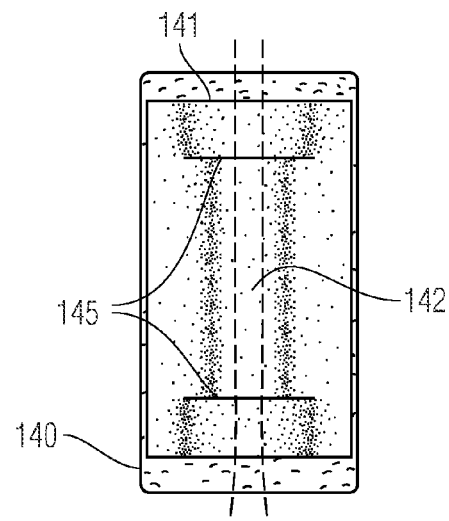
FIG. 14C illustrates a top back view of the accessory in FIG. 14A.

FIG. 14 shows a modified design of the embodiment disclosed in FIG. 13 wherein the sleeve 141 contains two vertical slits 145 designed to fit various larger sized arms of glasses. The sleeve 141 is made from stretchable or pliable material, such as neoprene, that allows it to fit over wide-armed glasses as well as small-armed glasses. The sleeve 141 is horizontally stitched or attached, such as by glue or an adhesive, to the flotation piece 140 along the length of the sleeve 141. The sleeve 141 is attached to the outer portion of the flotation piece 140 which creates a channel opening 142 between the sleeve 141 and flotation element 140. The channel opening 142 accommodates narrow armed glasses where the narrow arm is inserted in and through the narrow channel 142. The sleeve 141 also accommodates wide-armed glasses that fit through opening 146 created by the vertical slits 145. The interior surface of the flotation piece 140 could be rounded cut in order to maximize the opening for the arm 2.

Figure 15A:
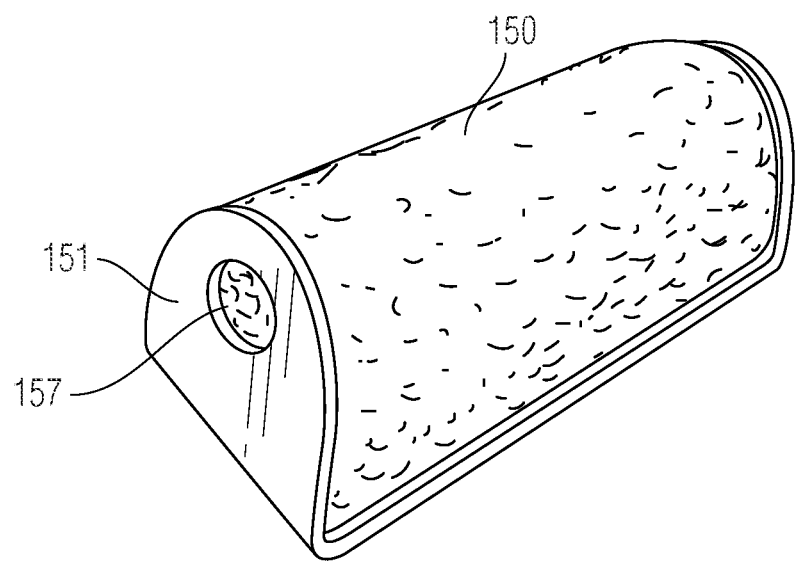
FIG. 15A illustrates a perspective view of a flotation accessory with an attached backing sleeve with end cap tabs.
Figure 15B:
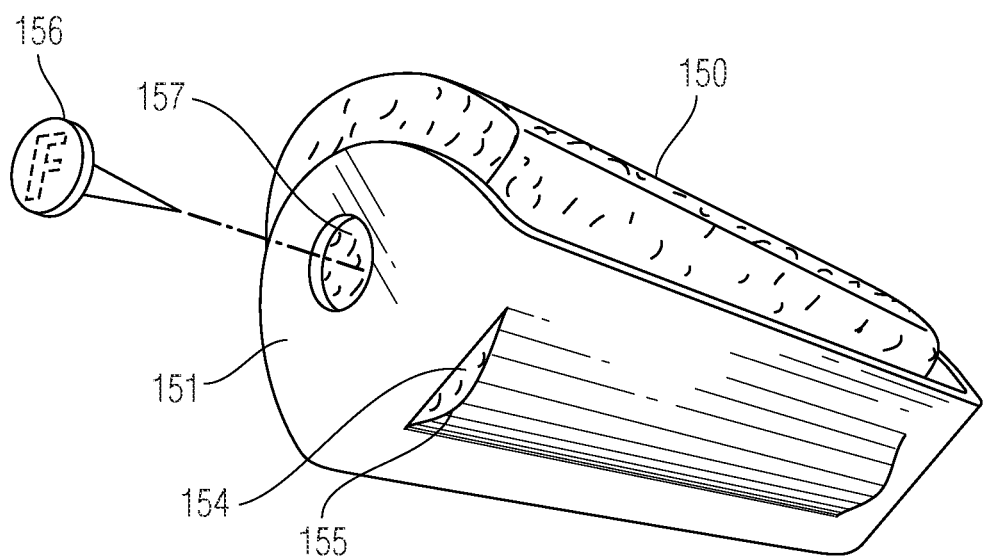
FIG. 15B illustrates a back perspective view of the accessory in FIG. 15A.

FIGS. 15A and 15B show a modified design of the embodiment disclosed in FIG. 12 wherein the sleeve 151 wraps around the end caps of flotation piece 150 and secured with a decorative pin 156 through the opening 157. The back of the sleeve 151 contains two vertical slits 155 that create an opening 154 where the arm 2 of a pair of glasses can fit through. The sleeve 151 is ideally made from stretchable or pliable material, such as neoprene or leather.

Figure 16A:
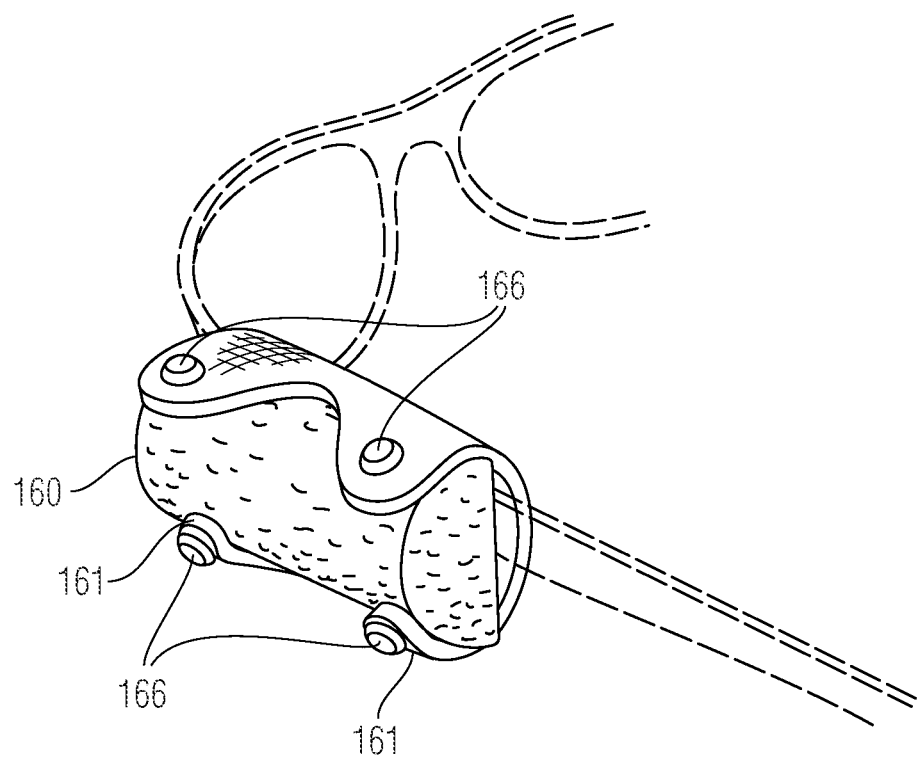
FIG. 16A illustrates a perspective view of a flotation accessory with an attached backing sleeve with upper and lower tabs and mechanical fasteners.
Figure 16B:
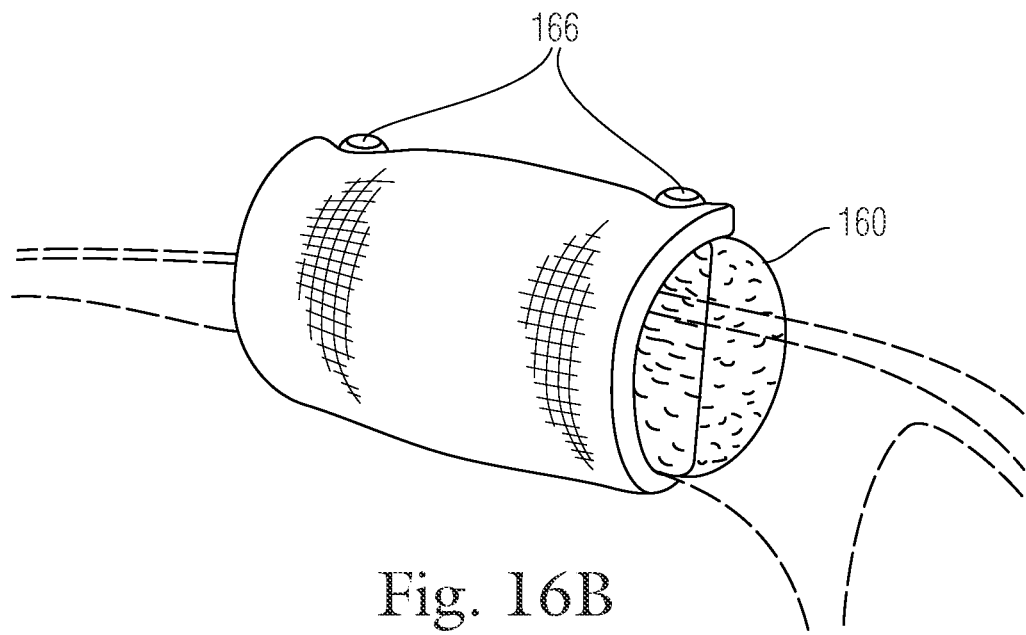
FIG. 16B illustrates a back perspective view of the accessory in FIG. 16A.

FIGS. 16A and 16B show a modified design of the embodiment disclosed in FIG. 12 wherein a portion of the upper flap of the sleeve 161 wraps around the top and bottom portions of the flotation piece 160 and affixed to a flotation piece 160 with four decorative pins 166 at its four corners. A dab of glue may be added to the backside of the decorative pin to provide extra adhesion to the sleeve 161 and flotation piece 160.

Figure 17A:
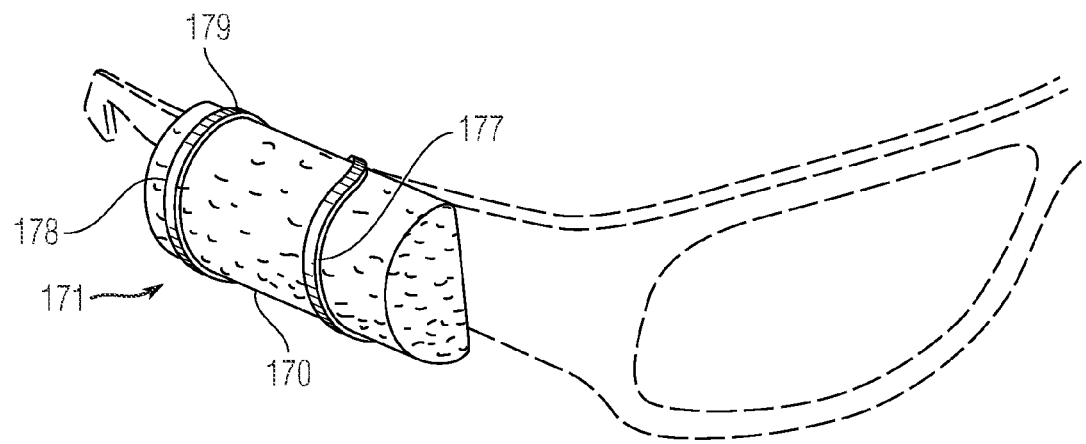
FIG. 17A illustrates a perspective view of a flotation accessory with a flexible cross member and flotation element.
Figure 17B:
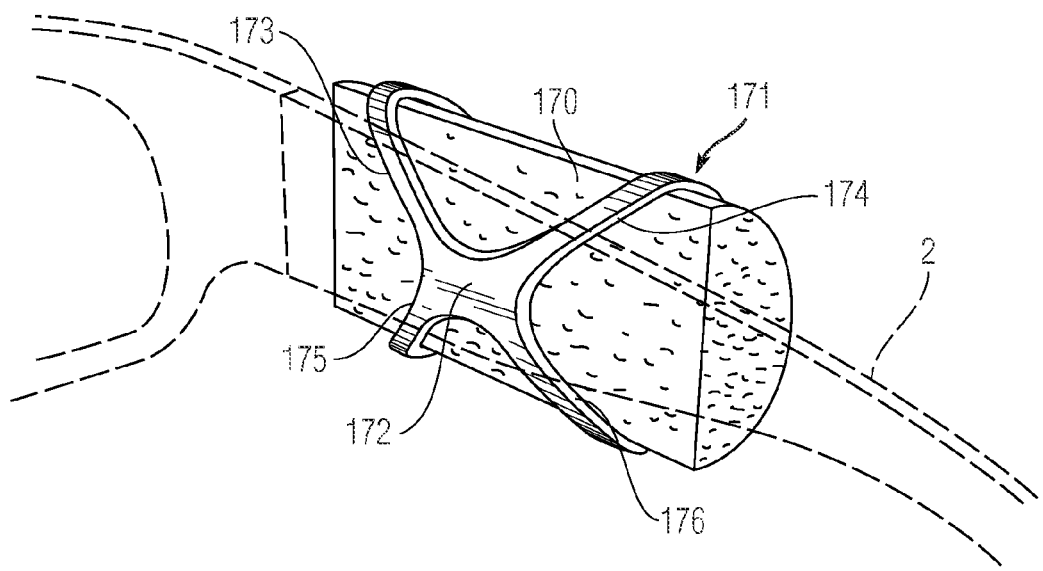
FIG. 17B illustrates a back perspective view of the accessory in FIG. 17A.

The pins 156 and 166 from FIGS. 15A, 15B, 16A, and 16B could be pins, screws, snaps, rivets, or any design which can mechanically fasten the sleeve 151, 161 to the flotation piece 150, 160. The pins 156, 166 could also use adhesive or glue as part of the fastening process which might glue the sleeve 151, 161 to the flotation element 150, 160 but might also glue the pins 156, 166 or the tips of the pins 156, 166 so they better adhere to the flotation pieces 150, 160. The sleeve 151, 161 may also be made of various material including scuba, nylon, leather, spandex, FIG. 17 is another embodiment of the present invention wherein a stretchable elastic piece 171 with a main backing area 172 with four legs or arms 173, 174, 175, 176 extending from the main back area 172. Two of the arms 173, 175 are connected by a first elastic band 177 and the other two arms 174, 176 are connected by a second elastic band 178. In the preferred embodiment, the first and second elastic bands 177, 178 are designed as half loops which wrap around the flotation piece 170 and secure it to the arm 2 of a pair of glasses. The first and second elastic bands 177, 178 are ideally manufactured as an extension of the legs or arms 173, 174, 175, 176 such as through 3-D printing or rubber molding. The arms or legs 173, 174, 175, 176 are primarily in one vertical plane with the first and second elastic bands 177, 178 designed to extend away from the arms or legs 173, 174, 175, 176 in a relatively perpendicular direction from a transition point 179. The two bands or half loops 177, 178 rest vertically on the front of the flotation piece 170 and are connected to the four legs or arms 173, 174, 175, 176 which bend over the top and bottom of the flotation piece 170 at a generally forty-five degree angle converging at the main back area 172 which may be shaped as a rectangular-shaped box located adjacent to the back of the flotation piece 170.

An opening is created between the back of flotation piece 170 and the main back area 172. The opening accommodates the arm 2 of a pair of glasses which fit through the opening or gap between the back of the flotation piece 170 and the main back area 172 of the elastic piece 171. The elastic nature of the elastic piece 171 keeps a tight snug fit of the flotation piece 170 and elastic piece 171 on the arm 2 of the glasses. For smaller arms 2, the main back area 172 may include one or more slits or an inside channel to slide the arms through or across.

The stretchable elastic piece 171 is ideally made from stretchable or pliable material, such as rubber or foam. Also the stretchable elastic piece 171 can come in a variety of colors, including tie-dye or camouflage, creating endless color combinations for purchasers. The stretchable elastic piece 171 could also be easily detachable which allows consumers to instantaneously change the color of the piece 171 to match the user's clothing or accessories.

The flotation piece 170 could also contain vertical slits or grooves on its front surface where the two bands or half loops 177, 178 of the stretchable elastic piece 171 can slide into creating a flush design and look. The groove design allows for limited visibility of the stretchable elastic piece 171 thus maximizing the exposure of the outer surface of the flotation piece 170 for branding or other promotional messages. In addition, the flotation piece 170 could be made of foam or cork and configured with various shapes or designs. By way of example, the floating piece 170 could be shaped like a car, a football, a helmet, a baseball bat, an alligator, a company logo, or any shape that might be desirable for promotional purposes. The stretchable elastic piece 171 could also integrate fiber optic lighting or contain glow-in-the-dark material that can maximize the present invention's visibility at night time.

Figure 18A:
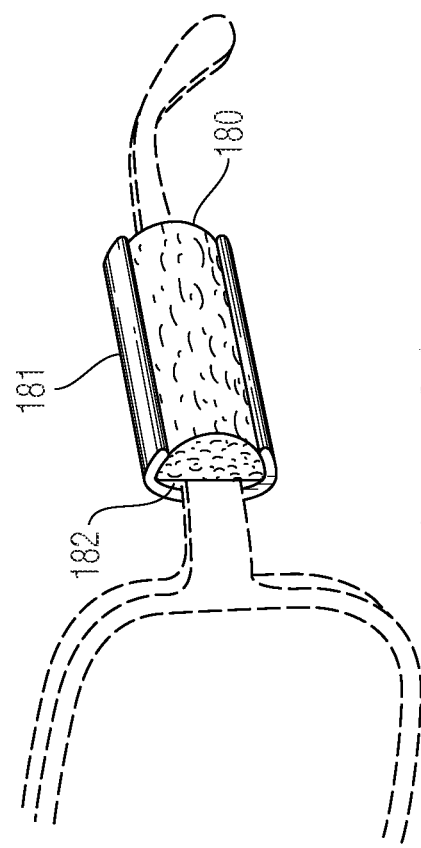
FIG. 18A illustrates a perspective view of a flotation accessory with a compression sleeve with a flotation element.
Figure 18C:
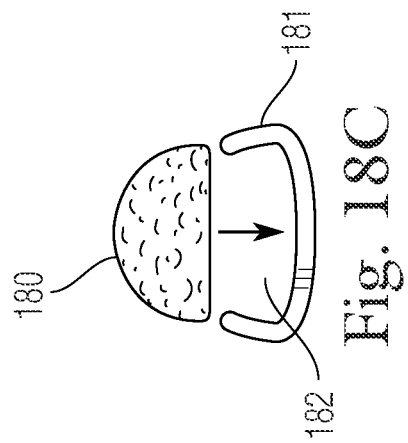
FIG. 18C illustrates an assembled side view of the accessory in FIG. 18A.
Figure 18B:
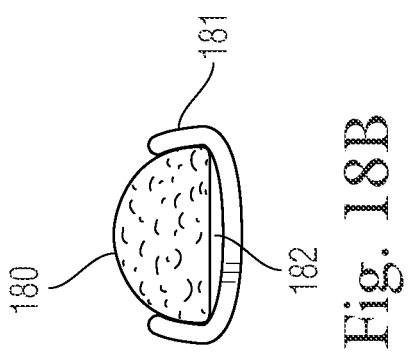
FIG. 18B illustrates an unassembled side view of the accessory in FIG. 18A.

FIG. 18 is another embodiment of the present invention wherein a flotation piece 180 snap fits into a hard shell backing 181. The hard shell backing could contain grooves or ridges to reduce the chance the flotation piece disconnects from the backing. The hard shell backing would be curved allowing for an opening 182 that can fit the arm 2 of a pair of glasses.

FIG. 19 is another embodiment of the present invention wherein a flotation piece 190 with a concave interior surface 191 generally has two extending edges 192. Adhered to the extending edges 192 are two flexible pieces 194. The two flexible pieces 194 have two inner tips 195 which are also resilient material. The flexible pieces 194 and inner tips 195 and are flexible enough to allow the arm 2 of a pair of glasses to pass through the opening 196 but then the flexible pieces 194 and inner tips 195 return to their original shape which prevents the flotation piece 190 from falling off of the arm 2 of the glasses. The flexible pieces 194 and inner tips 195 would bend or compress to accommodate different sized arms of different glasses. Additionally, the flexible pieces 194 and inner tips 195 would be rigid enough to securely fasten the present invention to the arm.

Figure 20A:
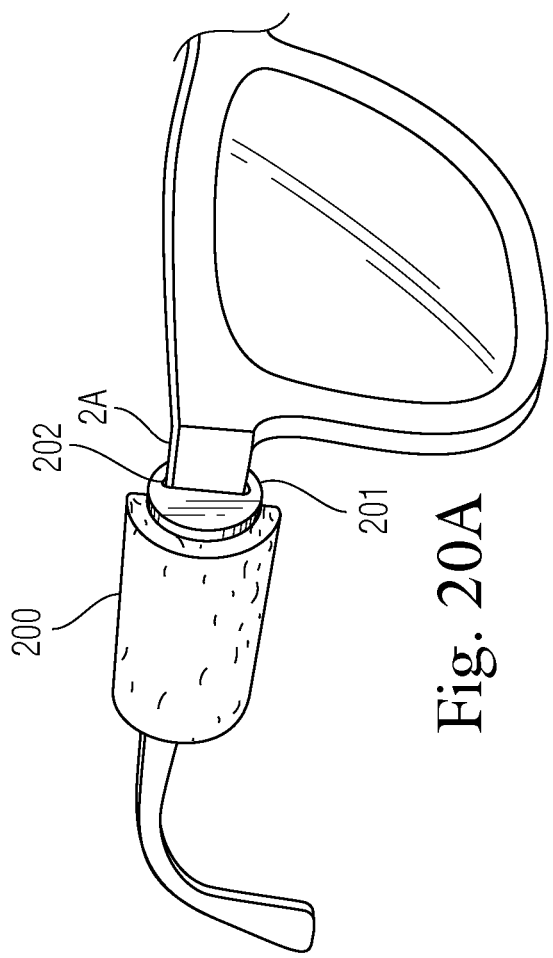
FIG. 20A illustrates a perspective view of a flotation accessory with end cap attachment tabs.
Figure 20B:
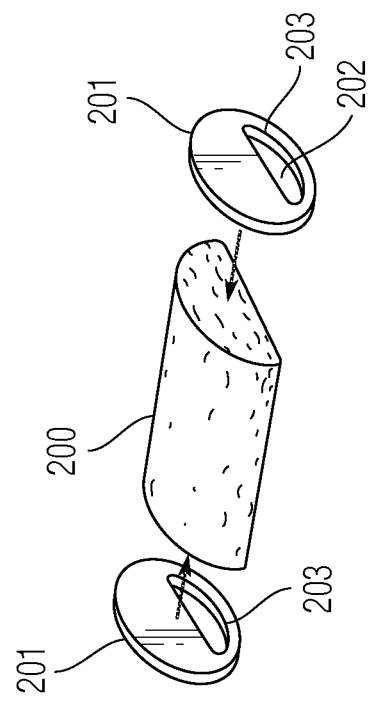
FIG. 20B illustrates an assembled perspective view of the accessory in FIG. 20A.
Figure 20C:
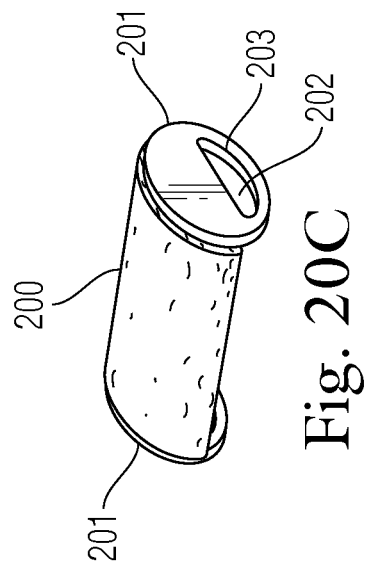
FIG. 20C illustrates an unassembled perspective view of the accessory in FIG. 20A.

FIG. 20 is another embodiment of the present invention wherein a floatation piece 200 secured at both ends to two circular-shaped discs 201 containing malleable slits 203. These malleable slits 203 are located on the protruding side of the disc 201 which is the edge not adhered to the floatation piece 200 and creates an opening 202 that fits the arm 2 of a pair of glasses.

Figure 21A:
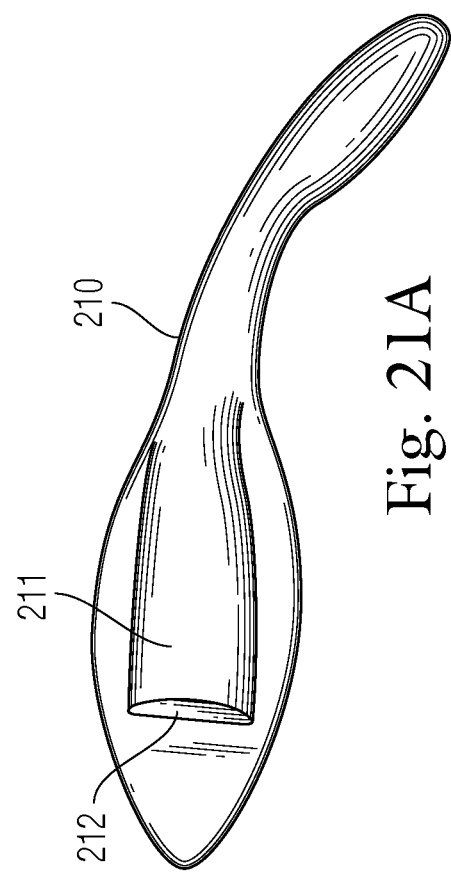
FIG. 21A illustrates a right side profile view of a full sleeve embodiment of the accessory of the present invention.
Figure 21B:
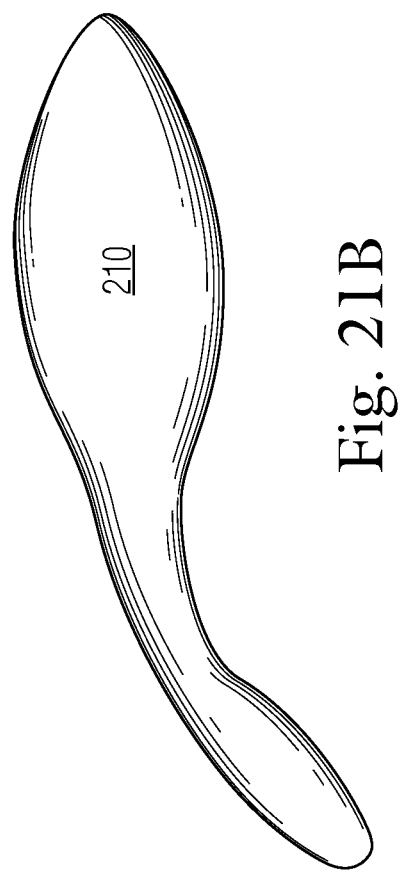
FIG. 21B illustrates a left side profile view of the accessory in FIG. 21A.

FIG. 21 is another embodiment of the present invention wherein a flotation piece 210 is inserted or stitched into a sleeve 211 or sock-like design that slides over the entire length of the arm of a pair of glasses. The sleeve or sock-like design would be a made from a malleable material and contain an opening 212 that can conform to the width of a variety of different sized arms.

FIG. 22 is another embodiment of the present invention wherein an inverted "U-shaped" tube 222 that could snap onto the entire length of an arm 2 of a pair of glasses. The U-shaped tube would consist of a floatable material strip 220 along the length of the tube's top and the tube's two sides 221 would be made with a harder plastic with grooves on its interior surface that can snap on to the arm. The present invention could also include clips that snap over the U-shaped tube and the arm of the glasses to further secure the invention to the arm as well allow the user to customize the clip's color, design, logo, etc. These clips could also be made out of a floatable material.

The examples provided herein are merely for the purpose of explanation and are in no way to be construed as limiting of the present method and product disclosed herein. While the invention has been described with reference to various embodiments, it is understood that the words which have been used herein are words of description and illustration, rather than words of limitation. Further, although the invention has been described herein with reference to particular means, materials, and embodiments, the invention is not intended to be limited to the particulars disclosed herein; rather, the invention expands to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What is claimed is:

1. An eyeglass accessory comprising:
    a flexible element having:
    a main area on a horizontal plane with a first arm, a second arm, a third arm, and a fourth arm extending from the main area on the horizontal plane;
    a first cross member connecting the first arm and the second arm;
    a second cross member connecting the third arm and the fourth arm;
    a flotation element having an inner surface which mates adjacent to the main area of the flexible element and an outer surface which mates with the first cross member and the second cross member, wherein the first cross member and second cross member extend around the outer surface of the flotation element; and
    wherein a channel is formed between the inner surface of the flotation element and the main area of the flexible element to receive an eyeglass arm of a pair of eyeglasses.

2. The eyeglass accessory of claim 1, wherein the first cross member extends in a generally perpendicular direction out of the horizontal plane; and wherein the second cross member extends in a generally perpendicular direction out of the horizontal plane.

3. The eyeglass accessory of claim 2, the flexible element is made from material comprised of at least one of a scuba material, nylon, leather, spandex, or rubber.

4. The eyeglass accessory of claim 1, wherein the main area, the first arm, the second arm, the third arm, and the fourth arm of the flexible element, form an X-shape.

5. The eyeglass accessory of claim 1, wherein the flotation element has a first groove for receiving the first cross member and a second groove for receiving the second cross member.

6. The eyeglass accessory of claim 1, wherein the first cross member and second cross member are semi-circular in shape.

7. The eyeglass accessory of claim 1, wherein the flotation element is formed into an artistic shape.

8. The eyeglass accessory of claim 7, wherein the artistic shape is one of a car, a football, an animal, a mascot, or a logo.

9. An eyeglass accessory comprising:
a flexible element having:
a main area with a first extension, a second extension, a third extension, and a fourth extension extending from the main area;
the first extension connected to the main area and in a solitary configuration relative to each of the second extension, third extension, and fourth extension;
the second extension connected to the main area and in a solitary configuration relative to each of the first extension, third extension, and fourth extension;
the third extension connected to the main area and in a solitary configuration relative to each of the first extension, second extension, and fourth extension;
the fourth extension connected to the main area and in a solitary configuration relative to each of the first extension, second extension, and third extension;
a flotation element having an inner surface which mates adjacent to the main area of the flexible element and an outer surface which mates with the first extension, the second extension, the third extension, and the fourth extension;
a first mechanical attachment element for securing the first extension to the outer surface of the flotation element;
a second mechanical attachment element for securing the second extension to the outer surface of the flotation element;
a third mechanical attachment element for securing the third extension to the outer surface of the flotation element;
a fourth mechanical attachment element for securing the fourth extension to the outer surface of the flotation element; and
wherein a channel is formed between the inner surface of the flotation element and the main area of the flexible element to receive an eyeglass arm of a pair of eyeglasses.

10. The eyeglass accessory of claim 9, wherein the flexible element has a first recess for receiving the first mechanical attachment and a second recess for receiving the second mechanical attachment.

11. The eyeglass accessory of claim 9, the first mechanical attachment element is comprised of at least one selected from the group consisting of a screw, a pin, a rivet, and a snap.

12. The eyeglass accessory of claim 9, wherein:
the first mechanical attachment element is constituted by a first pin; and the second mechanical attachment element is constituted by a second pin.

13. The eyeglass accessory of claim 9, wherein:
the first mechanical attachment element is constituted by a first pin;
the second mechanical attachment element is constituted by a second pin;
the third mechanical attachment element is constituted by a third pin; and
the fourth mechanical attachment element is constituted by a fourth pin.

14. An eyeglass accessory comprising:
a flexible element having:
a main area with a first extension, a second extension, a third extension, and a fourth extension extending from the main area;
a first cross member connecting the first extension and the second extension;
a second cross member connecting the third extension and the fourth extension;
a flotation element having an inner surface which mates adjacent to the main area of the flexible element and an outer surface which mates with the first cross member and the second cross member, wherein the first cross member and second cross member extend around the outer surface of the flotation element; and wherein a channel is formed between the inner surface of the flotation element and the main area of the flexible element to receive an eyeglass arm of a pair of eyeglasses.

15. The eyeglass accessory of claim 14, wherein the main area, the first extension, the second extension, the third extension, and the fourth extension of the flexible element, form an X-shape.

16. The eyeglass accessory of claim 14, wherein the flotation element has a first groove for receiving the first cross member and a second groove for receiving the second cross member.

* * * * *